WILLIAM F. HABERMANN
ROBERT M. HENDERSON INVENTOR.

THEIR ATTORNEY

United States Patent Office 3,520,868
Patented July 21, 1970

3,520,868
PROCESS FOR CONCENTRATING PROTEIN BY EXTRACTION WITH A SOLVENT
Robert M. Henderson, Dalton, and William F. Habermann, Pittsfield, Mass., assignors to Beloit Corporation, Beloit, Wis., a corporation of Delaware
Continuation-in-part of application Ser. No. 656,742, July 28, 1967. This application Apr. 14, 1969, Ser. No. 815,980
Int. Cl. A23j 1/04
U.S. Cl. 260—112
7 Claims

ABSTRACT OF THE DISCLOSURE

This invention relates to a process for removing soluble material from protein containing substances. The process consists of passing a protein material through a series of zones in contact with a solvent which solubilizes or leaches out the soluble portion to yield concentrated protein. The separation process involved in each zone consists of mixing a quantity of solvent obtained from the next succeeding zone with protein containing materials to extract the undesirable soluble materials, separating the solvent from the protein, withdrawing the solvent from that zone and recycling a portion of that solvent back into the zone while also passing the remaining portion of the withdrawn solvent back to the preceding zone.

BACKGROUND OF THE INVENTION

This application is a continuation-in-part of U.S. Ser. No. 656,742 filed July 28, 1967. The use of liquids or solvents to extract soluble materials from insoluble substances has long been practiced in a wide variety of industries. Such a practice permits essentially complete separation of the materials with relative ease. As first conceived, this method consisted merely of forming a slurry of the substance containing the soluble material in the solvent. After a predetermined length of time, the insoluble substance was then separated from the solvent and the soluble material was recovered from the solvent by various means such as distillation, precipitation and the like. However, such batch processes required large vessels and separating devices, thereby incurring substantial capital expense, and were not particularly efficient in extracting the last available portion of the soluble material from the substance. This is true normally because the solvent becomes less effective in dissolving the soluble material as the concentration of the soluble material in the solvent increases. Thus large volumes of solvent were needed to obtain relatively complete separation.

It was later proposed to operate this extraction process in a continuous manner, whereby a series of mixing and separating devices were connected together. As a further improvement, it was then discovered that improved efficiencies could be obtained if the solvent extracted from the final stage would be passed back to the next preceding stage and so on since the amount of soluble material remaining in the substance decreased as the substance was passed from each system on to the next. In this manner, the purest solvent, containing the least amount of dissolved material, contacted the purest substance being treated and therefore the capacity of the solvent to extract the soluble material was utilized most efficiently.

One industry in which this method of passing the solvent back has been found to have achieved great acceptance is the food industry. A particular example, which is set forth to demonstrate the techniques of the present invention is the production of protein concentrate. In this instance, the protein is contained in a raw food material such as fish, meat and meat offal, soya beans and other legumes such as peas, beans, etc., cotton seed, sunflower seeds, grape seeds, brewers grain, poultry and poultry offal and the like. A substantial portion of any of these edible products is protein and, as the world has been more conscious of the value of protein, greater efforts have been made to concentrate the protein by eliminating the other components of the food.

OBJECTS OF THE INVENTION

It is therefore an object of this invention to provide a process for separating protein from soluble substances contained in foods by the use of a solvent for the soluble portion such as fats and oils.

It is another object of this invention to utilize a solvent in such a process most efficiently.

Other objects will become apparent from a reading of the following description and claims.

THE DISCOVERY

It has now been discovered that the above and other objects of this invention may be achieved in the following manner. Basically, the invention comprises a process for removing soluble materials from protein containing substances wherein the substance is passed through a series of zones. Any number of zones may be employed, depending upon the desired purity and the particular solvents and food for protein sources, and for that reason the number of zones employed is defined as being the letter "N" where N is an integer of at least one. Most often, satisfactory separation of the protein from the soluble materials can be effected in two or three zones, although as set forth above, any number of zones may be employed.

A wide variety of protein containing materials may be processed according to the present invention such as: whole fish or frozen fish, meat and meat offal, brewers grain, distillers grain, soya beans, malt grains, poultry and poultry offal, cotton seed, sunflower seeds, and other seed types, soya beans and other legumes, such as peas, beans, and the like.

A number of solvents may be employed to remove the oils, fats, sugars, starches, and other undesirable portions of the natural food product from the protein to yield a protein concentrate. For example, water, isopropyl alcohol, ethyl alcohol, methyl alcohol, acetone, amyl acetate, ethyl acetate, hexane, t-butyl alcohol, tricholorethylene, methyl-ethyl ketone, and many of the common commercial solvents. Of course, mixtures of two or more solvents are sometimes quite effective in removal of soluble materials from protein containing foods and are to be considered as falling within the use of the word solvents as employed herein.

The particular steps of the present invention consist of introducing the protein containing material into each succeeding zone along with a quantity of solvent from the next succeeding zone. The solvent and the dissolved material therein are then separated from the protein in this zone. The protein is passed on to the next succeeding zone for treatment. As the protein is withdrawn from the zone, the solvent containing the dissolved fats, sugars, starches, and the like are also withdrawn from the zone, and a portion of this withdrawn solvent is recycled back into the zone at the point of addition of the protein containing material. The balance of the solvent is then passed back to the next preceding zone for use therein. Of course, the solvent introduced into the Nth zone is normally fresh solvent, and the solvent withdrawn from the first zone is usually removed from the system for recovery, purification, or disposal.

In a preferred embodiment of the present invention, a centrifuge may be employed to separate the solvent containing the soluble portion of the food from the protein. Most preferred for the purposes of this invention are centrifuges known as two stage centrifuges. Examples of these two stage centrifuges are the Models E.C. 016, E.C. 03, E.C. 04, and E.C. 06 types of screening centrifuges which are manufactured in France by Robatel et Mulatier and are available from the Jones Division of Beloit Corporation in the United States.

In one embodiment of the present invention the recycled portion of the solvent is withdrawn from a point near the discharge end of the centrifuge and is returned to the zone at a point near the entrance of the centrifuge. Prior to its introduction into the centrifuge, the solvent being recycled may be mixed with the protein containing material which is being processed. In yet another embodiment of this invention, the solvent from the next succeeding zone is introduced into the instant zone at a point near the discharge end of the zone. Thus when a centrifuge is being employed, the relatively fresh solvent coming from the next succeeding zone is introduced into the latter part of the centrifuge where it mixes with and passes through the protein containing material. The solvent extracts a portion of the soluble materials contained in the foodstuff and passes through the screen. After this washing effect is achieved, the solvent is recycled back into the centrifuge entrance where it mixes with the food being introduced into the centrifuge. Again the solvent extracts additional material from the protein material and passes through the screen of the centrifuge. The solvent at this point contains additional material which has been dissolved therein, and the solvent is now available for passage back to the next preceding zone where the same cycle is practiced.

DESCRIPTION OF THE DRAWINGS

To more fully describe the present invention and its various embodiments, reference is now made to the drawings, in which:

As shown in FIG. 1, the process of this invention is illustrated by a series of N zones where N is 3 in this instance. The three zones are labeled A, B, and C respectively. Each of the zones is represented by a means for separating liquids from solids while conveying solids which contains an outer shell 2 and an interior screen 4. The protein containing material is introduced through line 15 to the entrance of Zone A6 and is passed successively through these zones through the exit to Zone A at point 8 and the exit to Zone B and entrance to Zone C10 and is finally withdrawn through the exit to Zone C12 to line 15 in the form of a protein concentrate.

Figure 1:
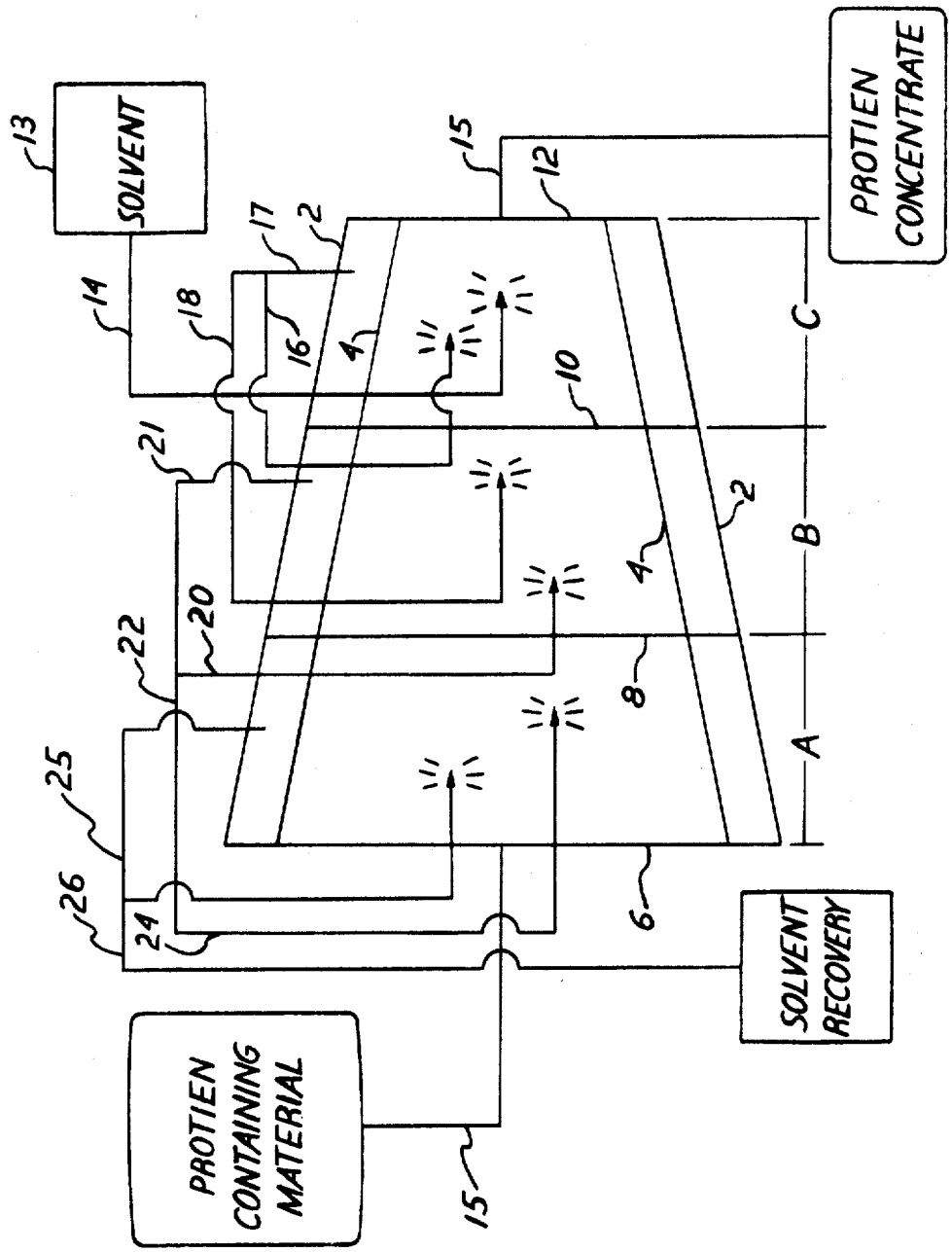
FIG. 1 is a schematic flow diagram showing the broad concepts of this invention.

Fresh solvent is supplied to the Nth zone, Zone C, through pipe 14 from solvent tank 13 which introduces the solvents into the interior of the Nth zone, Zone C. As the device operates, this solvent is passed through the screen 4 and is collected in the area between the screen 4 and the outside of the device 2. At this point, the most pure portion of the protein containing material, almost in the form of a protein concentrate, is being washed by fresh solvent to remove or extract the final amounts of soluble materials from the protein. The solvent is withdrawn through line 17 and a portion of the withdrawn solvent is recycled back into the interior of Zone C through pipe 16. The remaining portion of the solvent having been withdrawn from line 17 is passed on through pipe 18 where it in turn is introduced into the preceding zone, Zone B. The solvent introduced through line 16 into the interior of Zone C additionally washes the protein material and is collected in the area between the screen 4 and the shell 2.

After its introduction into the interior of Zone B, the solvent again extracts or washes a portion of a soluble material from the protein as it passes through Zone B. The solvent passes through the screen 4 and is trapped in the area between the screen 4 and the shell 2. This solvent now has a higher concentration of dissolved materials such as fats, oils, starches and other soluble materials. A portion of the solvent is recycled through pipe 20 back into the interior of Zone B. The balance of the solvent withdrawn from the zone by line 21 is sent on to the next preceding zone, Zone A, through pipe 22 where it is introduced into the interior of Zone A.

This zone again extracts additional soluble matter from the protein being passed through the zone and is collected in the portion of the device between the screen 4 and the shell 2. A portion of this solvent, now having a much higher concentration of dissolved matter, is recycled through line 24 and the remaining solvent is withdrawn from the system through line 26 for recovery. In each zone, the solvent has effectively two passes through the protein containing material because of the recycle, although adjustment of the flow rates could vary the number of passes. For example, by restriction of the flow in any one of the lines, the amount of solvent recycled back into the zone could be varied depending upon the particular choice of the operator.

Depending upon the particular protein containing material and the solvents employed, various conditions can be adjusted to achieve optimum extraction of the soluble matter from the protein containing material with the use of a minimum amount of solvent. It should be recognized that the recovery of solvent is an expense which should be minimized to improve the economics of the process. While the extraction capabilities of each system will be different, it is possible to adjust the rate of transfer of the protein containing material through the various zones so that maximum recovery of the protein concentrate is achieved. It is possible to adjust the proportion of solvent being recycled in each zone to insure sufficient contact of the solvent and the protein containing material. For example, by way of illustration, it is possible to adjust the flow of the solvent being withdrawn from Zone C so that ¾ of the solvent being withdrawn passes through pipe 16 for recycle and ¼ passes through pipe 18. Likewise Zone B may be adjusted to vary the ratio of solvent being passed through the pipes 20 and 22. Of course, to achieve continuity in operation, it is necessary to insure that the amount of fresh solvent introduced through pipe 14 is approximately equal to the amount of solvent withdrawn through pipe 26. The amount withdrawn through pipe 26 will be slightly less normally than the amount added through pipe 14, because an amount of solvent may be entrained in the substance exiting from the third zone at exit 12.

Figure 2:
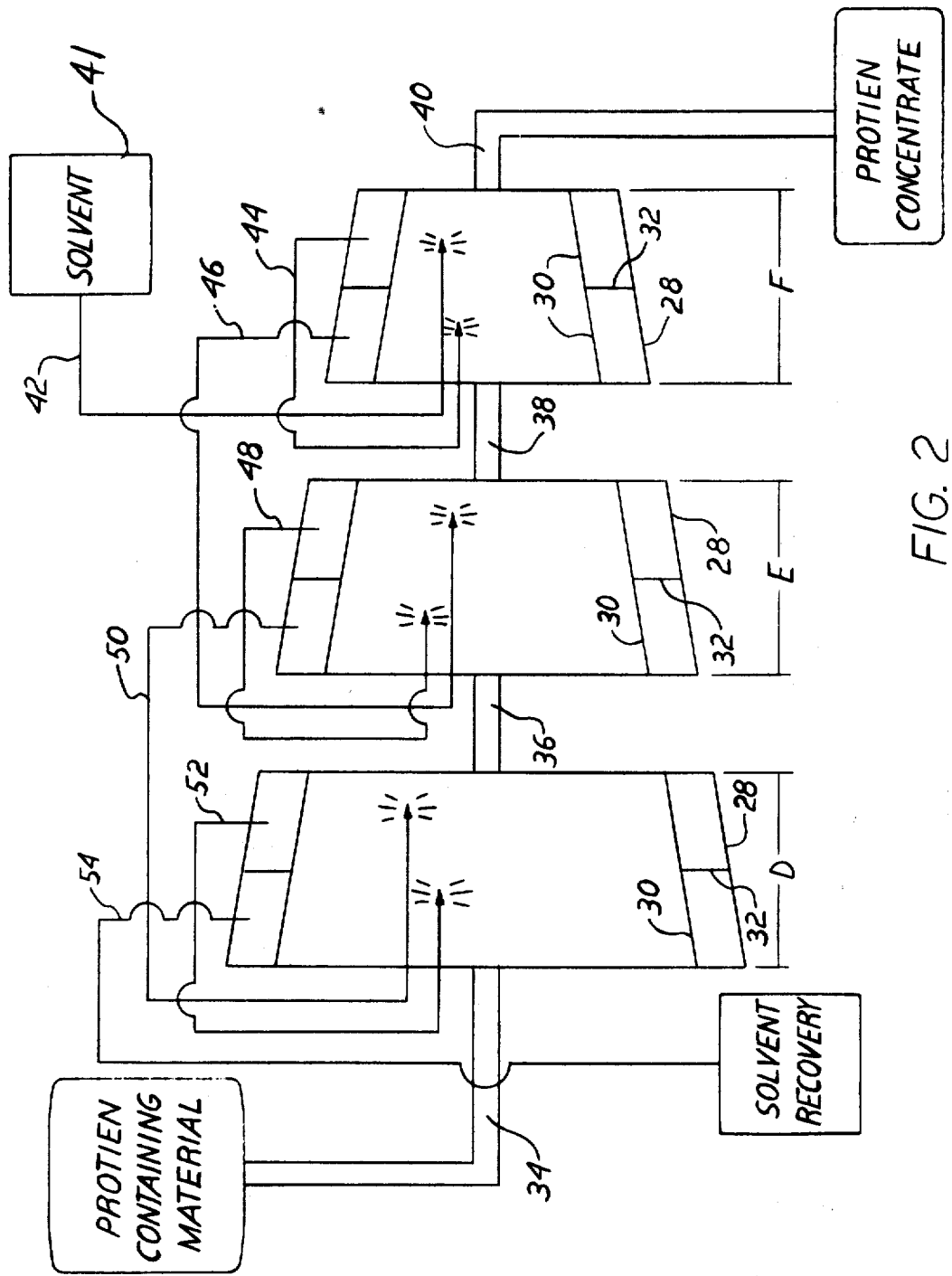
FIG. 2 is a schematic flow diagram demonstrating several preferred embodiments of the present invention.

FIG. 2 is a schematic flow diagram showing a preferred embodiment of the present invention in which again an N number of zones is employed wherein N is 3. The substance is passed through three centrifuges 28 which are represented by the Zones D, E, and F. The protein containing material is introduced into Zone D through line 34 and withdrawn from Zone D and introduced into Zone E through pipe 36. Likewise, the protein containing material is withdrawn from Zone E and introduced into Zone F through line 38. Finally, the protein concentrate is withdrawn from Zone F at point 40.

Fresh solvent is introduced from solvent supply 41 through pipe 42 into the interior of Zone F at a point near the exit 40. The solvent passes through the screen 30 after having mixed with and extracted soluble materials from the protein containing substance. The solvent is collected in the area between the screen 30 and the outside of the centrifuge 28, and is maintained near the exit half of the centrifuge by the retaining wall 32. This solvent, containing the last amount of material extracted from the substance is recycled back into the zone through pipe 44 to a point near the entrance of Zone F.

In a similar manner, this solvent passes through the protein containing material extracting additional soluble fats and is collected in the area defined by the screen 30 and the outside of the centrifuge 28. Again the retaining wall 32 insures that the solvent will remain near the front portion of the Zone F. The solvent is then transferred to the next preceding zone through pipe 46 where it is introduced into the centrifuge at a point near the exit of Zone E in pipe 38. This solvent extracts additional solubles and is collected between the screen 30 and the wall of the centrifuge 28 in retaining wall 32. This solvent after being collected is recycled through pipe 48 back into the front portion of Zone E where it again passes through the protein containing material collecting even more of the soluble matter. Pipe 50 then passes the solvent back to the next preceding zone, Zone D.

The solvent coming through pipe 50 is introduced into the centrifuge of Zone D at a point near its exit 36 where it passes through the substance and is collected and recycled through pipe 52. This solvent is introduced into the interior of the Zone D near the front part of the centrifuge where the final extraction is performed. At this point, the most easily extractable portions of the protein containing material are subjected to action by the solvent when it already contains a large portion of soluble material. This solvent is withdrawn from the system through pipe 54. Thus it can be seen that solvent extraction takes place twice in each zone with the use of a retaining wall 32 between the two portions of the means for collecting the solvent already separated from the protein containing material. The protein containing material is washed or treated with solvent with successfully purer solutions in direct proportion to the purity of the protein containing material. The pure solvent in pipe 42 contacts the protein concentrate at its purest state while the solvent containing the highest concentration of dissolved material, coming through pipe 52, passes through the raw protein containing material which contains the highest amount of soluble matter.

Figure 3:
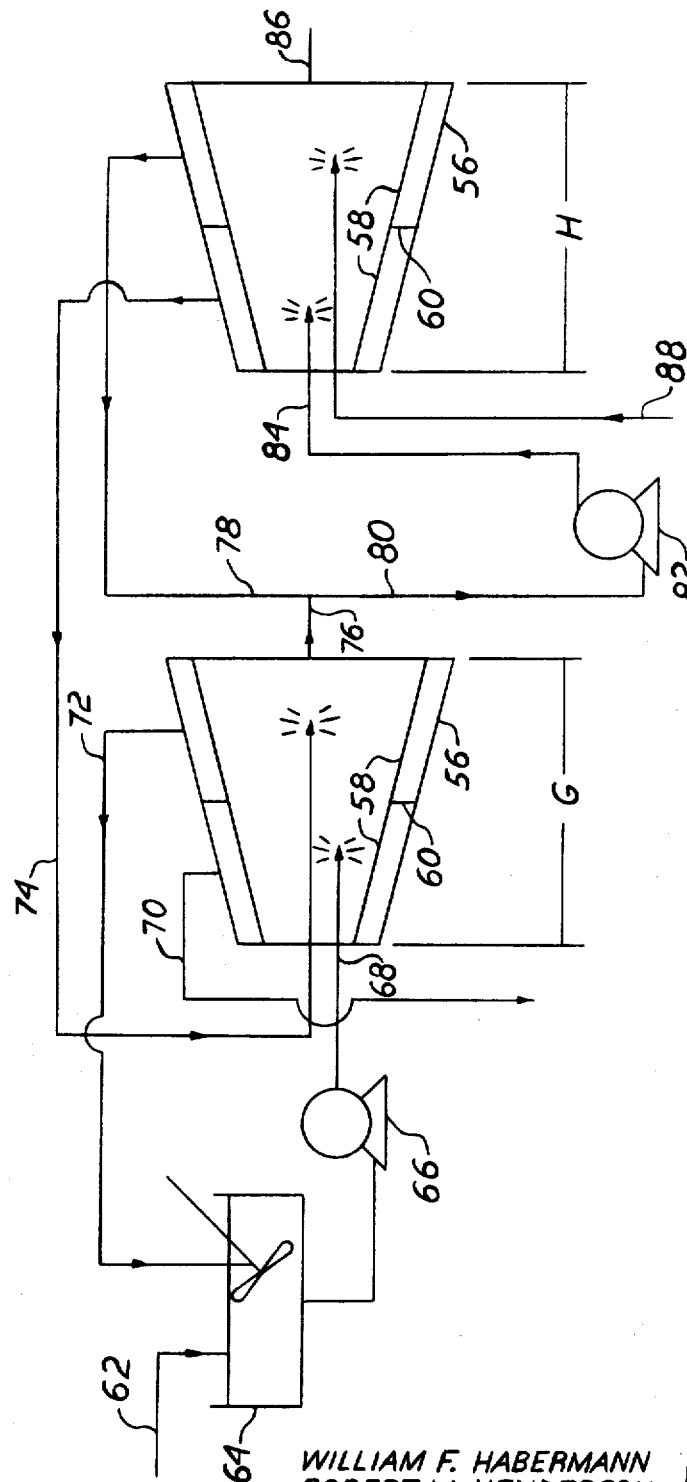
FIG. 3 is a flow diagram showing a specific embodiment in schematic form.

FIG. 3 represents a flow diagram wherein a pair of two stage centrifuges are employed in the separation of fish protein from raw fish by the use of isopropanol as a solvent. In this example, N is 2, thereby defining two zones G and H. Each centrifuge contains an outer wall 56 and an inner screen 58, with a retaining wall 60 separating the two stages of the zone. Raw fish is introduced through pipe 62 into a mixing tank 64 where it is mixed with isopropanol containing a high concentration of oils and other lipid materials. This mixture is transferred through pump 66 into the entrance of the first Zone G at point 68. The action of the centrifuge causes the solvent to pass through the screen 58 into the area defined by the outside of the centrifuge 56 and the screen 58 and the entrance side of the retaining wall 60. This collected solvent contains a very high concentration of the materials extracted from the fish and is withdrawn from the system through pipe 70.

As the fish passes from the entrance to the exit of the centrifuge, it is then washed with additional solvent. This solvent is introduced at a point near the exit of the zone from pipe 74 which contains solvent from the next succeeding Zone H. This solvent extracts additional oils from the fish and then forms the basis for the solvent transferred through pipe 72 to the mixing tank 64. After leaving the Zone G through point 76, the fish is mixed with the solvent in pipe 78 which is being recycled back into Zone H from Zone H. This mixture of recycled solvent and fish from the preceeding Zone G passes through pipe 80 by means of pump 82 into the entrance of Zone H at point 84. As the fish is introduced into Zone H, the solvent is collected through screen 58 in the area defined by screen 58 and the outside of the centrifuge 56 and is maintained near the entrance of the centrifuge by retaining wall 60. This solvent is passed through pipe 74 back to the preceding zone as previously described. Finally, as the fish passes towards the exit of Zone H, it is washed with fresh solvent which is introduced by pipe 88 at a point near the exit of the zone. In a similar manner as described before, this solvent extracts a portion of the materials contained in the fish and passes through screen 58 to form the solvent being recycled in pipe 78. The fish protein concentrate is then withdrawn through pipe 86 for such further processing as may be desired. Of course, separate mixing chambers can be employed prior to each zone if such is desired.

It can now be seen that the present invention provides a substantial improvement in the efficient use of solvents to extract soluble materials from protein containing materials. The solvent is handled in such a manner as to insure that each succeeding zone of extraction contains solvent of higher purity. More important, the protein containing material being treated in each zone is contacted with solvent of a higher purity than in the preceding zone followed by contact by solvent of even higher purity which was obtained from the next succeeding zone. In this manner, separation of the insoluble protein from the fats, oils, starches, sugars, and other soluble materials may efficiently be achieved without the use of large volumes of solvent or undue delay.

Having thus described the invention, what is claimed is: is:

1. A process for removing soluble material from protein containing said material with a solvent for said material by passing said substance through a series of N Zones where N is an integer of at least one and wherein said solvent extracts said material from said protein in each zone by the steps comprising:
    (a) introducing said protein containing material into each succeeding zone with a quantity of solvent from the next succeeding zone to permit extraction of said soluble material from said protein by said solvent;
    (b) separating said solvent and said soluble material from said protein;
    (c) passing said separated protein on to the next succeeding zone;
    (d) withdrawing said solvent containing said soluble material from said zone;
    (e) recycling a portion of said withdrawn solvent back into said zone at a point near the point of addition of said protein to said zone; and
    (f) passing the remaining portion of said withdrawn solvent back to the preceding zone for use therein, with the proviso that the solvent introduced into the Nth Zone is fresh solvent and the solvent withdrawn from the first zone is removed from the system.

2. The process of claim 1 wherein a centrifuge is used to separate said solvent and said soluble material from said protein.

3. The process of claim 1 wherein said solvent from said next succeeding zone is introduced into said zone at a point near the discharge end of said zone.

4. The process of claim 1 wherein said recycled portion of said solvent is withdrawn from the discharge end of said zone and returned to said zone at a point near the entrance of said zone.

5. The process of claim 1 wherein said solvent is withdrawn from a point near the entrance of said zone and is passed back to the next preceding zone, and additional solvent is withdrawn from the second part of said zone and is recycled to a point near the entrance of said zone.

6. The process for removing oil from fish protein containing said oil with a solvent for said oil by passing said fish protein through a system of two zones, wherein said solvent extracts said oils from said fish protein in each zone by the steps comprising:

(a) introducing the fish protein into the first zone in the presence of a solvent collected from the exit of said first zone and collecting solvent therefrom, said collected solvent being withdrawn from the system;

(b) further contacting said fish protein with additional solvent at a point near the exit of said first zone, said additional solvent being collected from a point near the entrance of said second zone;

(c) introducing said fish protein into said second zone in contact with solvent taken from a point near the exit of said second zone and separating said second zone exit solvent from said substance at a point near the entrance of said second zone;

(d) next contacting said fish protein with a fresh solvent at a point near the exit of said second zone and separating said fresh solvent from said substance at a point near the exit of said second zone; and (e) withdrawing said substance from the exit of said second zone.

7. The process of claim 6 wherein said solvent is isopropyl alcohol.

References Cited
UNITED STATES PATENTS

| | | | |
|---|---|---|---|
| 2,559,257 | 7/1951 | Obey | 260—123.5 |
| 2,567,179 | 9/1951 | Bonotto | 260—412.8 |
| 3,076,708 | 2/1963 | Cavanagh | 99—7 |
| 3,099,562 | 7/1963 | Rogers | 99—18 |
| 3,207,744 | 9/1965 | O'Hara et al. | 260—123.5 |
| 3,252,962 | 5/1966 | Whaley et al. | 260—112 |

WILLIAM H. SHORT, Primary Examiner

H. SCHAIN, Assistant Examiner

U.S. Cl. X.R.

99—14, 17, 18; 260—123.5